May 7, 1929.    G. T. MARKEY    1,711,800

STOCK WATERER

Filed March 1, 1923

INVENTOR.

George Thomas Markey

BY Erwin, Wheeler & Woolard

ATTORNEYS.

Patented May 7, 1929.

1,711,800

UNITED STATES PATENT OFFICE.

GEORGE THOMAS MARKEY, OF FORT ATKINSON, WISCONSIN, ASSIGNOR TO JAMES MANUFACTURING COMPANY, OF FORT ATKINSON, WISCONSIN.

STOCK WATERER.

Application filed March 1, 1923. Serial No. 621,991.

My invention relates to improvements in stock waterers, with particular reference to portable watering devices for hogs, sheep, and other animals.

The objects of this invention are to provide an inexpensive portable stock watering outfit which can be constructed almost wholly from sheet metal; which will be provided with a detachable reservoir, released for the purpose of removal by the removal of a cover; in which the reservoir will be provided with a float controlled valve mechanism removable with the reservoir; in which an improved float controlled valve mechanism will be provided, whereby repairs, replacements, and adjustments are facilitated; in which the reservoir is enclosed by a protecting casing or jacket, suitably spaced from the reservoir and adapted to protect the water in the reservoir from freezing; in which detachable drinking bowls may be housed in such a manner as to permit one animal to drink therefrom to the exclusion of others; in which the drinking bowls may be fed from the reservoir through an intermediate passage in such a manner that the probability of the passage becoming foul through back flow of water from the drinking bowl or bowls is reduced to a minimum; in which delivery of water from the reservoir to the drinking bowl is controlled by a float in the intermediate passage, suitably guarded and so constructed as to be effective under all working conditions; in which one or more heaters may be employed which will be properly protected and safeguarded to eliminate danger of fire; and in which the drinking bowls may be manually removed and replaced but can not be dislodged by the animals.

A further object of my invention is to provide a stock watering device having an open reservoir; a jacket spaced therefrom, and a cover for both the reservoir and the jacket which can only be removed by first lifting it and then sliding it to open position, whereby an accidental removal of the cover becomes impossible.

In the drawings.

Like parts are identified by the same reference characters throughout the several views.

Figure 1:
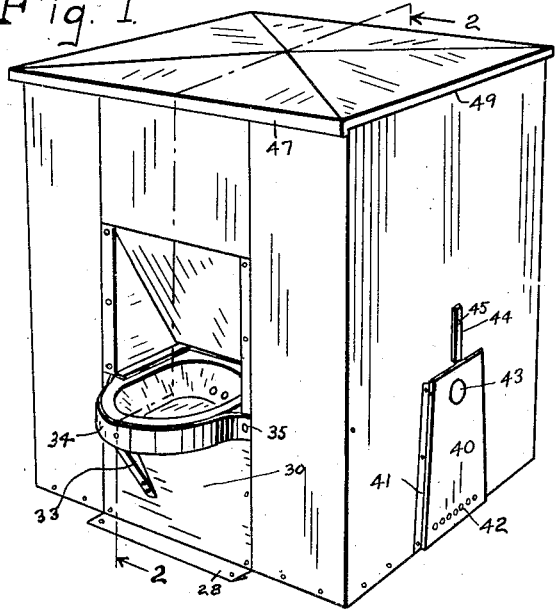
Figure 1 is a perspective view of a stock watering outfit embodying my invention.
Figure 3:
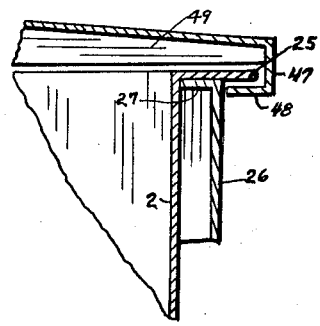
Figure 3 is a detail sectional view showing a fragment of the cover and associated parts.
Figure 2:
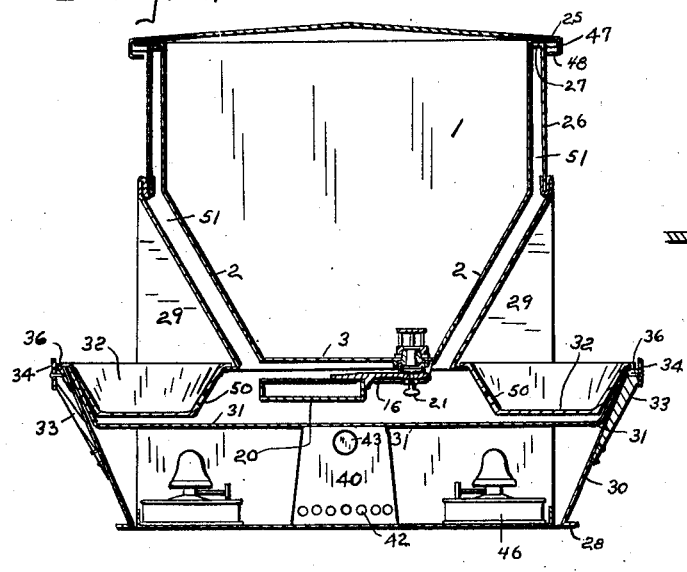
Figure 2 is a sectional view of the same, drawn on line 2—2 of Figure 1.
Figure 4:
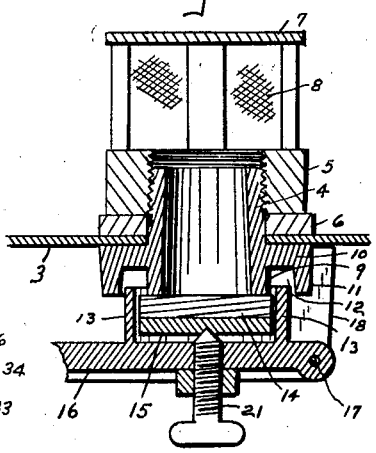
Figure 4 is a detail view of the float-controlled valve.

The reservoir 1 is provided with walls, the lower portions 2 of which are inwardly tapered from opposite sides. The bottom 3 is provided with an aperture to which a valve seat member 4 is fitted and clamped in position by an interior threaded nut 5 and a clamping plate 6. The nut is provided with a raised guard plate 7 connected therewith by posts which also support a screen 8.

The valve seat member is faced at 9 to provide an annular valve seat. Above the valve seat there is an outwardly projecting annular clamping flange 10 with a downturned marginal portion 11 spaced from the member 4 and forming a channel 12 to receive a valve enclosing cage 13 within which a disk valve 14 may be loosely seated upon a carrying plate 15.

The case 13 is carried by a float lever 16 fulcrumed at 17 to a set of supporting arms 18 connected with the clamping flange 10. A float 20 is secured to the free end of the float lever 16, and a set screw 21 extends upwardly through the lever along a line which extends through the center of the cage 13, the upper end of the screw being preferably tapered and socketed in the valve supporting disk 15. whereby the valve may be raised or lowered by adjusting the set screw.

The reservoir 1 has outwardly projecting flanges 25 along the upper margins of its walls, whereby the reservoir may be hung upon the upper margins 26 of suitable jacket walls, said margins preferably having inturned flanges 27. The side walls of the jacket 26 are recessed at 29, and below this recess the lower portion of the jacket is formed with an outwardly extending portion 30 which tapers downwardly to the base 28, and which, in its upper portion, co-operates with the walls of the recess to receive a water conveying trough 31 and a drinking bucket 32. The water conveying trough 31 preferably extends transversely across the jacket with its respective ends hung upon the walls 30. Said walls are centrally reenforced by bracing members 33 which also support a guard rail 34 which may be formed from sheet metal with end flanges bolted or riveted to the casing at 35. The upper margin of the rail 34 extends above the drinking cup 32, and the latter is provided with a downturned flange 36 which engages in the space between the upper margin of the wall 30 and said guard.

The base portion of the jacket at each end is provided with a vertically sliding door 40 running in marginal guides 41 and provided with draft apertures 42 and a viewing aperture 43 which may be covered by glass. A locking bar or button 44 is pivoted to the casing at 45 and in one position is adapted to prevent the door from being lifted. In its other position of adjustment the door can be lifted and may have sufficient play in its guides to allow it to pass the button.

The cover is provided with side flanges 47 having inturned lower margins 48. At the ends the cover is provided with depending flanges 49 which are of less width than the flanges 47. The reservoir flange 25 projects outwardly beyond the jacket 26 and overhangs the inturned margin 48 of the cover flange 47. Normally the flange 49 extends below the level of the reservoir flanges 25, thereby preventing an endwise sliding movement of the cover. The inturned margin 48 prevents an extended vertical movement of the cover, but by lifting the cover slightly the flange 49 may be raised above the level of the reservoir flange 25, whereupon the cover may be pushed longitudinally and wholly removed if desired. When so removed, the reservoir 1 may be lifted from the jacket, its flanges 25 being utilized for this purpose.

When the reservoir 1 is in its normal position within the jacket the valve and float will be in registry with the trough 31 for water delivery into the trough. When the latter has been filled to the desired degree the float 20 is lifted by the water to close the valve 14 against the seat 9. The water from the trough 31 passes through apertures 50 in the inner walls of the bowl or bowls, these apertures being located below the normal level of the water in the trough 31 and above the bottom of the bowl in each instance.

The structure and arrangement of the trough and bowls is similar to that disclosed in my former application, Serial No. 468,810, filed May 12, 1921.

It will be observed that the jacket 26 is spaced from the reservoir 1, and it will be understood that warm air from the lamp containing base of the jacket may pass upwardly on both sides of the trough 31 into the jacket space 51 above the trough, whereby the contents of the reservoir may be kept above freezing temperature. The water in the trough 31 will, of course, be kept at a still higher temperature, suitable for drinking purposes. It is desirable that the water in the trough 31 and cups 32 be kept at a temperature which will encourage the animals to drink a normal quantity of water.

It is noted that the removable drinking cups 32 perform the function of keeping clean the water in trough 31. Any sediment or débris falling into the cups 32 may be instantly removed therefrom merely by lifting the cup from the end of the trough and inverting the cup to discharge its contents at some point remote from the jacket and trough. It will be noted, however, that in this particular device the removable cup performs a further function in that it cooperates with the inwardly bent portions 29 of the jacket to prevent the animals from having access to the float whereby the water level in the trough is controlled. While the float is thus retained inaccessible to the animals it will be obvious that upon removal of one of the drinking cups 32 float and valve are rendered manually accessible so that the float may be manipulated to increase the depth of water in the trough if desired or the valve may be manipulated to free it from foreign matter which would prevent it from seating fully or the adjusting screw 21 may be operated. The fact that the drinking cup is instantly removable and replaceable renders the valve mechanism instantly accessible for any such purpose while securing it against accidental operation by the animals.

I claim:

1. In a stock waterer having an enclosing jacket and a reservoir suspended therein, the combination with said reservoir and jacket of a cover having depending side flanges provided with inturned margins adapted for sliding interlocking relation with the jacket and reservoir, and means for normally preventing the cover from sliding while allowing it to slide when raised to a limited extent from normal position.

2. In a device of the character described, the combination with a jacket and a reservoir removably mounted therein, of a valve operative in a lower portion of the reservoir and at one side of the center thereof, a float disposed beneath the reservoir and extending beyond the center thereof from said valve said float being operatively connected for the control of said valve, a trough extending continuously transversely of said jacket and having its ends exposed exteriorly thereof, and freely removable cups in the exposed ends of said trough, said cups being immediately adjacent said float and said valve respectively, whereby said float and said valve will be manually accessible upon the removal of the cup adjacent thereto.

3. In a stock waterer, the combination with a jacket having a trough extending horizontally therethrough and projecting from the sides thereof, a cup removably positioned in each of the projecting portions of said trough, a reservoir within said jacket having an outlet adjacent one of said cups, a valve for closing said outlet, a float for controlling said valve extending to a position adjacent the other of said cups, and means for adjusting said valve relative to said float, said float and adjusting means being wholly enclosed by the jacket and by the cups when the latter are positioned in the trough and exposed for manual manipulation when said cups are removed from said trough.

4. In a stock waterer, the combination with a jacket open at its top, of a reservoir removably positioned in said jacket and having a flange supporting said reservoir from the margin of said open top and projecting laterally from the sides of said jacket and a cover having a flange encircling and extending below the flange on said reservoir, said cover flange on two opposed sides thereof being longer than the other sides of the flange and having inturned margins extending beneath the flange on said reservoir, whereby when said cover is lifted vertically it may be slid horizontally for removal from said reservoir.

5. In a stock waterer, the combination with a jacket open at its top and having an inturned flange constituting the margin of said top, of a reservoir open at its top and having an outwardly projecting flange supporting said reservoir on the inturned flange and projecting beyond the sides of said jacket, and a cover having a downwardly extending flange encircling the outwardly projecting flange, said downwardly extending flange being longer on two of the opposed sides of said cover and provided with inturned margins extending directly beneath the outwardly projecting flange of said reservoir, whereby when said cover is moved vertically it may be moved horizontally for removal from said reservoir.

GEORGE THOMAS MARKEY.